United States Patent [19]

Kikuchi et al.

[11] Patent Number: 4,678,725

[45] Date of Patent: Jul. 7, 1987

[54] HERMETICALLY SEALED STORAGE BATTERY

[75] Inventors: Yoichi Kikuchi, Fujisawa; Kenji Kobayashi, Oiso, both of Japan

[73] Assignee: Matsushita Electric Industrial Co., Inc., Osaka, Japan

[21] Appl. No.: 882,982

[22] PCT Filed: Nov. 8, 1984

[86] PCT No.: PCT/JP84/00538

§ 371 Date: Jun. 30, 1986

§ 102(e) Date: Jun. 30, 1986

[87] PCT Pub. No.: WO86/03060

PCT Pub. Date: May 22, 1986

[30] Foreign Application Priority Data

May 11, 1983 [JP] Japan .................. 58-83108

[51] Int. Cl.⁴ .................. H01M 2/12
[52] U.S. Cl. .................. 429/53; 429/56
[58] Field of Search .................. 429/53, 54, 56, 86, 429/162, 181, 127

[56] References Cited

U.S. PATENT DOCUMENTS

| | | | |
|---|---|---|---|
| 2,282,459 | 5/1942 | Deeley | 429/56 |
| 3,607,401 | 9/1971 | Halpert | 429/127 |
| 3,870,566 | 3/1975 | Bergum et al. | 429/162 |
| 4,256,813 | 3/1981 | Kniazzeh | 429/86 |
| 4,439,500 | 3/1984 | Gibbard et al. | 429/53 |

FOREIGN PATENT DOCUMENTS

| | | | |
|---|---|---|---|
| 0269013 | 3/1965 | Australia | 429/163 |
| 0086739 | 4/1953 | Netherlands | 429/163 |
| 1346011 | 2/1974 | United Kingdom | 429/194 |

Primary Examiner—Donald L. Walton
Attorney, Agent, or Firm—Wenderoth, Lind & Ponack

[57] ABSTRACT

A hermetically sealed storage battery has a group of plates sheathed with a housing which is constituted by a synthetic resin film or sheet that is resistant to the electrolyte and is heat-weldable. Portions of the housing which surround the periphery of the group of plates are formed into a sealing portion by heat-welding together films or sheets of the type described above. A pair of terminal pieces protrude from the group of plates through the sealing portion. Part of the sealing portion is provided with safety valve which is constituted by an adhesion portion formed by portions of the films or sheets which are overlaid one upon the other. Thus it is possible to provide a hermetically sealed storage battery which has a simplified housing structure and which is capable of smoothly discharging any gas to the outside when there is an increase in the cell's internal pressure.

8 Claims, 6 Drawing Figures

HERMETICALLY SEALED STORAGE BATTERY

TECHNICAL FIELD

The present invention relates to a hermetically sealed storage battery comprising a group of plates as packaged in a synthetic resin film or sheet wrapping which is electrolyte-resistant and heat-weldable. The invention simplifies the construction of a housing for a group of plates, with the housing itself constituting a safety valve necessary for a storage battery.

BACKGROUND ART

Regarding the primary battery which is not charged and produces no gas or little gas in discharge, there is known a construction such that the current generation element and plate group are packaged liquid- and gas-tight in a synthetic resin film housing. In this construction, the housing structure for the battery is very much simplified.

However, in the storage battery which is charged and produces gases in charge, mere enclosure of the plate group by such a housing does not allow withdrawal of evolved gases from the cell and with a gradual build-up of the internal pressure of the cell, the housing is ruptured to cause scattering of the electrolyte, etc. Thus, this type of housing as such is not desirable and a safety mechanism that permits withdrawal of gases was required.

As electrical appliances using a storage battery as a power source and, particularly, portable electrical appliances are progressively miniaturized and reduced in thickness, there has been a demand for a hermetically sealed storage battery which is similarly compact and thin and long serviceable.

DISCLOSURE OF THE INVENTION

The present invention provides a hermetically sealed storage battery which is suitable for use as a power source in such applications. The hermetically sealed storage battery according to the present invention comprises a group of plates held in an electrolyte as hermetically sealed in a wrapping or housing constituted by a synthetic resin film or sheet which is electrolyte-resistant and heat-weldable, with portions of the housing which surround the periphery of said group of plates excepting a safety valve portion being formed into a sealing portion by thermal interwelding of strips of the resin film or sheet, and a pair of terminal pieces protruding from the group of positive and negative plates through the sealing portion, said safety valve being constituted by an adhesion portion formed by portions of the film or sheet which are laid one upon the other so that when the internal pressure of the cell increases beyond a predetermined level, said adhesion portion is opened by the gas accumulated in the cell to allow the gas to escape to the atmosphere.

The plate group is formed in such a manner that the electrical capacity of the positive plate is larger than that of the negative plates, and the electrolyte is held by these plates and a separator so as to ensure no liberation of electrolyte and the oxygen gas evolved from the positive plate upon charging is ionized and removed by the negative plates so that, as a battery, the positive plate is rate-determining.

Therefore, when the amount of oxygen gas evolved from the positive plate at charging is within the capacity of the negative plates to ionize and remove the oxygen gas, the gas is absorbed and removed by the negative plates within the cell and substantially none escapes through the safety valve. Thus, the hermetic sealing effect is easily accomplished.

However, if the amount of oxygen gas evolved form the positive plate exceeds the capacity of the negative plates to absorb and remove the oxygen gas, the evolved oxygen gas is accumulated within the cell to increase internal pressure of the cell and when this pressure exceeds the physical strength of the housing itself, the housing is ruptured to damage the battery and the appliance using the battery as a power source is also damaged.

The safety valve is provided for preventing such an event, and when the internal pressure of the cell exceeds a limit, the adhesion portion is expanded by the gas in the cell so as to let the gas escape out to keep the storage battery safe.

The safety valve in the present invention is characterized in that it is constituted by the very wrapping or housing that accommodates the plate group. To make the housing itself form a safety valve, it is sufficient to provide an adhesion portion formed by overlapping of portions of the synthetic resin film or sheet and this construction does not require use of a rubber valve body and a valve seat or valve cylinder which it is seated on or accommodated in.

And the function of the safety valve is such that when the internal pressure of the cell becomes excessive, the adhesion portion is opened to let the gas escape from the housing as mentioned above and when the gas pressure within the cell has dropped below the recovery pressure of the housing, the adhesion portion is quickly closed again to prevent reaction of the infiltrating atmospheric oxygen with the negative plates and the consequent self-discharge of the negative plates.

The preferred method for attaining the above purpose is to coat the adhesion portion formed by the overlapping of the resin film or sheet at the safety valve portion with a liquid sealing agent which is electrolyte-resistant and substantially non-drying so as to improve the gas-tight seal at the adhesion portion at normal times. By so doing, the adhesion portion is positively closed gas-tight except when the safety valve is opened so that the interior of the cell is shielded from the outside atmosphere.

BEST MODE FOR CARRYING OUT THE INVENTION

The particulars of the present invention will now be described with reference to embodiments of the hermetically sealed storage battery.

Figure 1:
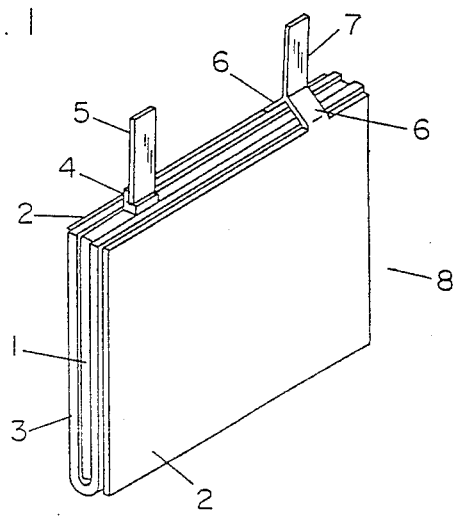
FIG. 1 is a perspective view showing the plate group used in the hermetically sealed storage battery according to the present invention.

As will be apparent from FIG. 1, the plate group is constituted by a positive plate (50 mm long×70 mm wide×3.0 mm thick), two negative plates (50 mm long×70 mm wide×1.3 mm thick), and a glass mat separator 3 which separates the positive and negative plates from each other. Now, the positive plate 1 is sandwiched between portions of the U-shaped separator, with the two negative plates 2 being juxtaposed on either side of the positive plate and the electrical capacity of the positive plate is set at a valve smaller than the sum of the electrical capacities of the two negative plates. The top edge of the positive plate is provided with a terminal base 4 to which a positive terminal piece is welded. On the other hand, the top edges of the two negative plates 2 are provided with short extruding members 6 in opposed relation, with the tips of the members 6 being joined and a negative terminal piece is welded to the joined portion. Thus, the terminal construction for the negative plates is in an inverted Y configuration.

The above plate group 8 is sandwiched between two strips of an acid-resistant, heat-weldable synthetic resin film, for example a polyethylene film with a thickness of 0.3 mm, and except a safety valve portion 10 to be described hereinafter, the portion of the housing 9 that surrounds the plate group 8 is heated with a hot press from the outside at a temperature of 150° C. for about 1 minute to thereby heat-weld the strips of polyethylene film together to provide a sealing portion 11. In forming this sealing portion 11, the portions of terminal pieces 5 and 7 which contact the polyethylene film have been pretreated to ensure good thermal welding of the polyethylene and one bottom side of the plate group 8 may be heat-welded after filling of electrolyte dilute sulfuric acid in such an amount as will be retained without liberation by the plate group.

The safety valve 10 is constituted by an adhesion portion formed as portions of polyethylene film protruding in the form of tongues are laid one on the other without being welded. The adhesion portion of said safety valve 10 is opened when the internal pressure of the cell exceeds a certain level (in excess pressure) to release the cell gas from the gap, while it is closed when the pressure is below said predetermined level to hermetically seal the gap.

In the above construction, the conditions conducive to a better function of the safety valve, particularly, a more positive gas seal during value closure time are as follows.

Regarding the material of synthetic resin used as the housing, it has been found that polyethylene and polypropylene are more conducive to an efficient discharge of the internal gas and a better gas sealing effect than AS (acrylonitrile-styrene copolymer) or ABS (acrylonitrile-butadiene-styrene copolymer). The thickness of the resin film or sheet is also a factor and the thicker the sheet or film, the better is the above result.

Figure 3:
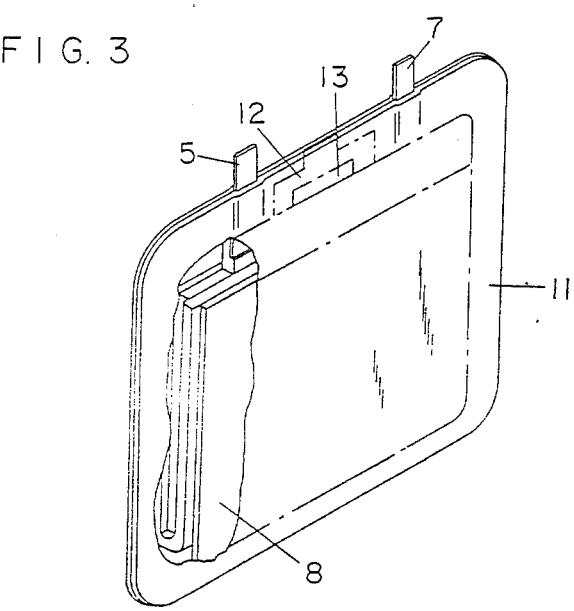
FIG. 3 is a partially exploded perspective view showing another hermetically sealed storage battery embodying the present invention.
Figure 4:
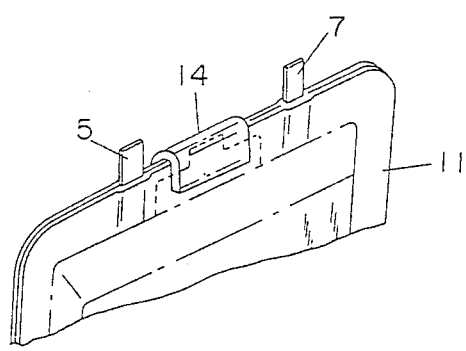
FIG. 4 is a partial perspective view showing a still another hermetically sealed storage battery embodying the present invention.

Moreover, the narrower in width and greater in length of the safety valve, that is the adhesion portion formed by parallel opposed portions, the greater is the gas sealing effect. However, if the width of the adhesion portion is too narrow, the valve will be subject to an excessively high internal pressure when the battery is over-pressurized, with the consequent damage to the battery. Therefore, it is desirable to select a suitable width and a sufficient length. To provide such a sufficient length, a labyrinthine structure may be used and this will contribute to an improved gas seal. Referring to FIGS. 3 and 4, if a heat-welded portion 13 presenting a local intermediate block in an unwelded gas discharge path 12 is provided, an extended distance of gas discharge can be substantially obtained. The heat welding for this purpose can be effected easily and in one operation by using a hot press jig machined to a predetermined size.

Figure 2:
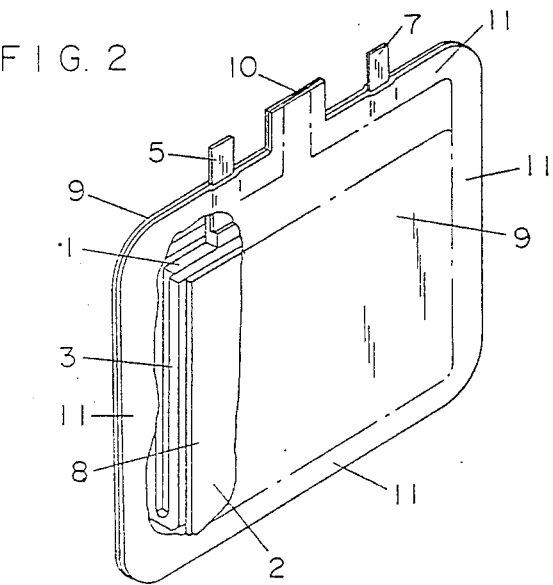
FIG. 2 is a partially exploded perspective view showing the hermetically sealed storage battery comprising the plate group packaged in a housing according to the present invention.

Furthermore, when the tight-fitting film portion of the safety valve 10 is coated with an electrolyte-resistant, substantially non-drying liquid sealing agent such as silicone oil as shown in FIGS. 2 and 3, the surface tension of the sealing agent serves to effect an intimate closure of the joined film members in valve closure to prevent entry of the atmospheric air into the battery cell.

Furthermore, a still improved reliability of the gas seal can be obtained if, as shown in FIG. 4, in addition to the coating of the safety valve 10 with a sealing agent such as silicone oil, the safety valve is held with a clip 14 or the like which is made of an elastic material from outside of the housing 9.

Silicone oil which is used as said liquid sealing agent has a viscosity of 1000 cps or less, preferably a viscosity of 800 cps, and is preferably applied to the adhesion portion of resin film with a coverage of 0.03 g/cm$^2$.

Figure 5:
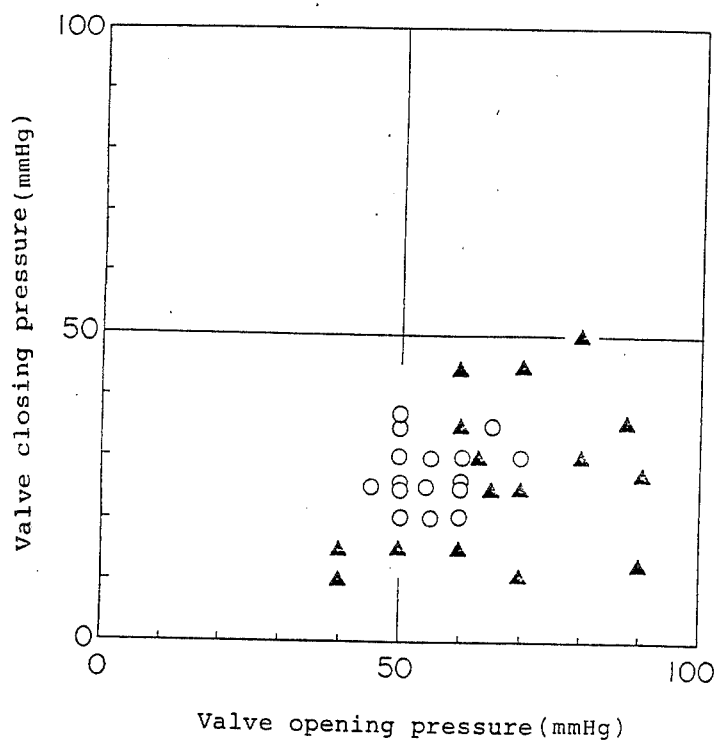
FIG. 5 is a diagram showing the relation between valve-opening pressure and valve-closing pressure of the safety valve in a hermetically sealed storage battery according to the present invention.

FIG. 5 shows the relation between valve opening pressure and valve closing pressure in the battery with a film adhesion portion coated with silicone oil (indicated by the mark O in the diagram) and the battery with an uncoated film adhesion portion (indicated by the mark Δ in the diagram). The opening pressure of the silicone oil-coated safety valve is concentrated in the range of atmospheric pressure+50 to 60 mm Hg with a small variation, and the valve closing pressure is also concentrated in a narrow range of atmospheric pressure+20 to 30 mm Hg, again with a small variation. On the other hand, the safety valve not coated with silicone oil shows a valve opening pressure of atmospheric pressure +40 to 90 mm Hg and a valve closing pressure of atmospheric pressure +10 to 50 mm Hg, both showing increased variations.

Therefore, in order to ensure opening and closing of the safety valve at stable, constant pressure, it is effective to coat the film adhesion portion of the safety valve with silicone oil.

Figure 6:
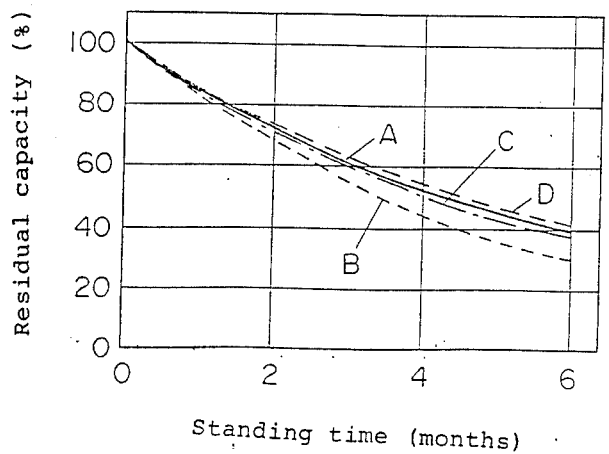
FIG. 6 is a diagram showing the relation between standing time and residual capacity of a hermetically sealed storage battery according to the present invention.

FIG. 6 is a diagram showing the relation between standing time and residual battery capacity (with the initial capacity being taken as 100%) when each of the above batteries was fully charged and allowed to stand in an atmosphere of 40° C. In the diagram, A shows the battery with the conventional safety valve equipped with a rubber valve body in a valve cylinder and B shows a storage battery according to the present invention. Compared with A, B is slightly inferior in self-discharge characteristic.

The battery C (shown in FIG. 3), which is another embodiment of the present invention, wherein the film adhesion portion of the safety valve has been coated with silicone oil and the battery D (shown in FIG. 4), which is still another embodiment of the present invention, wherein the safety valve has been coated with silicone oil and held with a clipping member made of an elastic material such as ABC resin from outside, showed substantially the same characteristic as the conventional battery A.

It will be apparent from the foregoing results that the storage battery according to the present invention provides a safety valve which requires none of the usual valve components such as a valve body, valve cylinder, etc. but such that the wrapping or housing material itself constitutes a safety valve which is simple in structure and compatible with a thin battery.

Furthermore, the gas sealing effect of the safety valve can be further improved by coating the film adhesion portion of the safety valve with an electrolyte-resistant, substantially non-drying liquid sealing agent such as silicone oil.

The valve opening and valve closing pressures of the safety valve are much dependent on the thickness and material of the resin film or sheet used as the housing material and generally the greater the thickness of the resin and the narrower the width of the adhesion portion serving as a gas discharge passageway, the higher is the valve opening pressure. Therefore, the housing or wrapping is preferably selected with reference to the intended application of the battery.

The foregoing description has been limited to hermetically sealed lead storage batteries but the invention can also be applied to hermetically sealed alkaline storage batteries using an alkaline electrolyte. Moreover, the wrapping or housing structure may not only be constituted by two resin films or sheets but also be made of a single film or sheet folded in the manner of the letter U or a tubular resin film or sheet, for instance. The housing formed by folding a film or sheet in the U-shape may be heat-welded along its three open sides to obtain necessary sealing and the tubular material may be heat-welded to close the two open sides thereof for sealing.

Thus, the present invention provides the following effects.

(1) As the construction of the safety valve is such that it is formed by leaving a portion of a synthetic resin film or sheet unwelded, the welding operation can be easily mechanized and the safety valve can be formed in a short time. Therefore, compared with the conventional battery using a rubber valve body, the process involves a lesser number of steps, is conducive to high productivity, and contributes to a cost reduction of batteries.

(2) As the construction according to the present invention is such that the plate group is wrapped up in a synthetic resin film or sheet with simultaneous formation of a housing and a safety valve as an integral unit, the insertion of the plate group into the housing can be mechanized, which could not be made in the case of the conventional battery, so that the number of battery assembling steps can be reduced.

(3) In terms of materials, the housing and safety valve as a whole can be constituted by the synthetic resin film or sheet only, with the result that the material cost can be decreased.

Industrial Utility

Thus, in the present invention, the housing structure for enclosing the plate group is simple in construction and, moreover, as the housing itself forms a safety valve necessary for a storage battery, there is provided a hermetically sealed storage battery which is compact, thin and suitable for use as a power source for portable electrical appliances.

We claim:

1. A hermetically sealed storage battery comprising a plate group consisting of a positive plate, negative plates and a separator separating said plates from each other, an electrolyte retained by said plate group, a housing constituted by an electrolyte-resistant, heat-weldable synthetic resin film or sheet, a sealing portion formed in the portion of said housing that surrounds the periphery of said housing, a pair of terminal pieces protruding out through said sealing portion, and a safety valve formed in a portion of said sealing portion, said sealing portion being constituted by a heat-welded portion formed by welding members of said resin film or sheet together, and said safety valve having an adhesion portion formed by members of said resin film or sheet laid one on the other whereby when the internal pressure of the cell becomes excessive, the gas in the cell forces open said adhesion portion to escape out.

2. A hermetically sealed storage battery according to claim 1 wherein the adhesion portion formed by members of synthetic resin film or sheet is provided in a labyrinthine form.

3. A hermetically sealed storage battery according to claim 1 wherein said adhesion portion of the safety valve has been coated with an electrolyte-resistant, substantially non-drying liquid sealing agent.

4. A hermetically sealed storage battery according to claim 3 wherein said liquid sealing agent applied to said safety valve adhesion portion is silicone oil.

5. A hermetically sealed storage battery according to claim 4 wherein the outer side of said safety valve has been held by a clip.

6. A hermetically sealed storage battery according to claim 2 wherein said adhesion portion of the safety valve has been coated with an electrolyte-resistant, substantially non-drying liquid sealing agent.

7. A hermetically sealed storage battery according to claim 6 wherein said liquid sealing agent applied to said safety valve adhesion portion is silicone oil.

8. A hermetically sealed storage battery according to claim 7 wherein the outer side of said safety valve has been held by a clip.

* * * * *